(12) United States Patent
Miyata

(10) Patent No.: US 7,134,684 B2
(45) Date of Patent: Nov. 14, 2006

(54) AIRBAG APPARATUS, MOTORBIKE WITH AIRBAG APPARATUS

(75) Inventor: Yasuhito Miyata, Shiga (JP)

(73) Assignee: Takata Corporation (JP)

( * ) Notice: Subject to any disclaimer, the term of this patent is extended or adjusted under 35 U.S.C. 154(b) by 169 days.

(21) Appl. No.: 10/857,823

(22) Filed: Jun. 1, 2004

(65) Prior Publication Data

US 2005/0040628 A1 Feb. 24, 2005

(30) Foreign Application Priority Data

Aug. 22, 2003 (JP) ............................. 2003-208397

(51) Int. Cl.
*B60R 21/16* (2006.01)
(52) U.S. Cl. .................. 280/730.1; 280/743.2
(58) Field of Classification Search ............. 280/730.1, 280/733, 743.1, 743.2, 749
See application file for complete search history.

(56) References Cited

U.S. PATENT DOCUMENTS 6,007,090 A 12/1999 Hosono et al.

2004/0150197 A1 8/2004 Iijima et al.

FOREIGN PATENT DOCUMENTS

JP 2002 2137779 5/2002
JP 2002137780 A 5/2002

*Primary Examiner*—Faye M. Fleming
(74) *Attorney, Agent, or Firm*—Fitch, Even, Tabin & Flannery

(57) ABSTRACT

An airbag configuration technology which contributes to intensive protection of a rider of a motorbike in case of accident, and other technologies related thereto are provided. An airbag apparatus including an airbag and an elongated webbing for anchoring the airbag to the vehicle body side is mounted to a motorcycle as a motorbike. The airbag is deployed and inflated while projecting toward a rider protecting area in case of a front collision of the motorcycle. The webbing holds the front side of the airbag with respect to the vehicle body via an extending portion which abuts against the outer surface of a front-side panel-forming cloth from the back side of the vehicle body when deployment and inflation of the airbag are completed, so that the movement of the airbag toward the front of the vehicle body is restricted by a tensile strength of the webbing, and the movement of the airbag in the direction of projection is allowed in the process of deployment and inflation of the airbag.

16 Claims, 4 Drawing Sheets forward direction with respect to the vehicle body

AIRBAG APPARATUS, MOTORBIKE WITH AIRBAG APPARATUS

FIELD OF THE INVENTION

The present invention relates to a configuration technology for an airbag apparatus to be mounted to a motorbike.

BACKGROUND OF THE INVENTION

Hitherto, there are various publicly known technologies for protecting a rider by mounting an airbag apparatus to a motorbike are known. For example, in a motorcycle, a technology in which the airbag apparatus side and the vehicle body side (vehicle body frame) are connected with an anchor member and, when an airbag is deployed, the anchor member extends with the airbag to retain the airbag (for example, see Japanese Unexamined Patent Application Publication No. 10-35564). According to this technology, the rider can be retained by the airbag even on a vehicle body which is opened in all directions like the motorbike.

SUMMARY OF THE INVENTION

The present inventor has devoted himself to study an effective technology to ensure protection of the rider by the airbag apparatus in case of accident, in which the airbag and the vehicle body frame are connected by the anchor member. As a result of the study, the present inventor found that the airbag can be deployed and inflated smoothly by pursuing the structure of the anchor member and the arrangement of the anchor member with respect to the airbag, whereby reliable protection of the rider in case of accident is achieved.

In view of such circumstances, it is an object of the present invention to provide an airbag configuration technology which contributes to intensive protection of the rider of the motorbike in case of accident, and other technologies related thereto.

In order to achieve the above-described object, the invention is configured as stated in claims. The invention stated in the claims may be applied to the configuration of the airbag apparatus to be mounted to various motorbikes. In this specification, the term "motorbike" widely includes saddle-riding type vehicles, that is, vehicles of the type in which the rider sits on the seat astride. For example, a motorcycle of a type in which a fuel tank is provided in front of the rider's seat and a scooter-type motorcycle in which a space is formed between the rider's seat and a handle-supporting head pipe are both included. In addition to the motorcycle, such vehicles that three or more wheels are provided and the rider sits on a saddle (such as a three-wheeler bike used for delivery of Pizza, a three- or four-wheeler buggy type bike having off-roadability), or even such vehicles that traveling is achieved on sleighs or with an endless caterpillars and the rider sits on a saddle, such as a snowmobile, are also widely included in the "motorbike".

In the invention according to a first form, an airbag to be mounted to a motorbike includes an airbag and an anchor member.

The airbag of the present invention is configured in such a manner that inflation gas is supplied therein in case of front collision of the motorbike. Typically, a configuration in which the airbag and mechanism for inflating the airbag, for example, an inflator, are stored in a retainer as a retaining member, and inflation gas is supplied into the airbag when the inflator is activated, is employed. Accordingly, the airbag is deployed and inflated while projecting toward a rider protecting area formed in front of the rider.

The anchor member of the present invention has an elongated shape and configured to anchor the airbag to the vehicle body side of the motorbike. The anchor member may have an elongated shape having a strength that can retain the airbag on the vehicle body side. The term "elongated" in the present invention is intended to widely include a belt-shape or a strip-shape, and typically, webbing which is formed of resin fiber strings or the like into a belt-shape is preferably used.

According to the present invention, the anchor member restricts the forward movement of the airbag with respect to the vehicle body by retaining the airbag on the vehicle body side by its tensile strength when deployment and inflation of the airbag are completed. The anchor member is adapted to allow the movement of the airbag in its projecting direction in the process of deployment and inflation of the airbag. Typically, the length and the position of the anchor member are selected to allow the movement of the airbag in its projecting direction in the process of deployment and inflation of the airbag, and restrict the movement of the airbag in its projecting direction when the deployment and inflation of the airbag are completed.

The present inventor, having devoted himself to study influences between the airbag and the anchor member, found that a configuration in which the tensile strength of the anchor member is reduced in the process of deployment and inflation of the airbag, that is, until deployment and inflation of the airbag are completed, contributes to smooth deployment and inflation of the airbag, which is very effective to ensure protection of the rider. Therefore, in the present invention, the anchor is adapted not to impede the action of the airbag projecting toward the rider protecting area as much as possible. The term "allow" in this invention is intended to mean that the anchor member allows the movement of the airbag in it projecting direction, and includes not only the case in which the movement of the airbag in its projecting direction is allowed completely, but also the case in which the movement is restricted in some degree.

In particular, in the present invention, the extending portion of the anchor member extends so as to be capable of abutting against the outer surface of the front wall portion of the airbag with respect to the vehicle body. That is, the extending portion of the anchor member is disposed outside the airbag. The extending portion abuts against the outer surface of the front wall portion of the airbag with respect to the airbag when deployment and inflation of the airbag are completed, so as to hold the front side of the airbag with respect to the vehicle body from the back side with respect to the vehicle body. Typically, it is configured such that the extending portion of the single strip of the anchor member extends from mounting portion provided on the back side of the airbag with respect to the vehicle body via the outer surface of the front wall portion of the airbag with respect to the airbag to the original position on the mounting portion. Accordingly, the forward movement of the airbag with respect to the vehicle body is restricted by the tensile force of the anchor member exerted to the extending portion.

In this arrangement of the present invention, the airbag is prevented from being urged forwardly of the vehicle body when retaining the rider with the operation of the anchor member having the extending portion which abuts against the outer surface of the front wall portion of the airbag with respect to the airbag, and hence the airbag can generate sufficient resistance for restraining the rider. Since the anchor member of the present invention is configured to be disposed outside the airbag, a load exerted toward the outer periphery of the airbag when deployed and inflated can be received by the entire anchor member. Therefore, the strength against the load exerted from the airbag when deployed and inflated can be increased by selecting the shape and material of the anchor member as needed, so that it can cope with a larger load exerted when restraining the rider. This is advantageous, for example, in comparison with the configuration in which the anchor member is disposed inside the airbag.

According to the invention of the first form described above, the airbag apparatus which ensures intensive protection of the rider in case of accident is achieved.

In addition to the configuration of the first form, the airbag apparatus according to a second form further includes an insertion portion on the outer surface of the wall portion of the airbag on the front side of the vehicle body. The extending portion of the anchor member is inserted into the insertion portion. Typically, the insertion portion is configured by a plurality of cloth strips stitched on the airbag along the position where the extending portion of the anchor member extends so as to provide a gap for allowing the anchor member to pass through between each cloth strip and the airbag.

In this arrangement of the present invention, the anchor member inserted through the insertion portions is allowed to move in the extending direction of the anchor member with respect to the airbag while being guided by the insertion portions. Therefore, for example, the shape of the airbag when deployed and inflated may be stabilized in comparison with the configuration in which the anchor member is fixed to the airbag, and the load exerted toward the outer periphery of the airbag when deployed and inflated can be received reliably by the entire anchor member disposed outside the airbag.

The anchor member of the first or second forms is preferably disposed in the center area of the vehicle body extending between legs of the rider according to a third form. The term "center area of the vehicle body" in the present invention widely includes a space in the vehicle body extending along substantially the center of the rider in plan view, and typically, a space in the vehicle body extending between the legs of the rider sitting on the seat astride. In the present invention, the anchor member is adapted so as not to be caught on, or come into contact with, the rider.

In this arrangement of the present invention, the anchor member is prevented from being caught on the rider and from impeding smooth operation of the airbag when deployed and inflated as much as possible.

The invention according to a fourth form is a motorbike with an airbag apparatus, which is provided with the airbag apparatus according to the first form. In this motorbike, the anchor member constituting the airbag apparatus includes the extending portion and is configured to be mounted to the back side of the rider protecting area with respect to the vehicle body.

With this arrangement of the present invention, a motorbike with the airbag apparatus which contributes to intensive protection of the rider in case of accident is achieved.

DETAILED DESCRIPTION OF THE PREFERRED EMBODIMENTS

Figure 1:
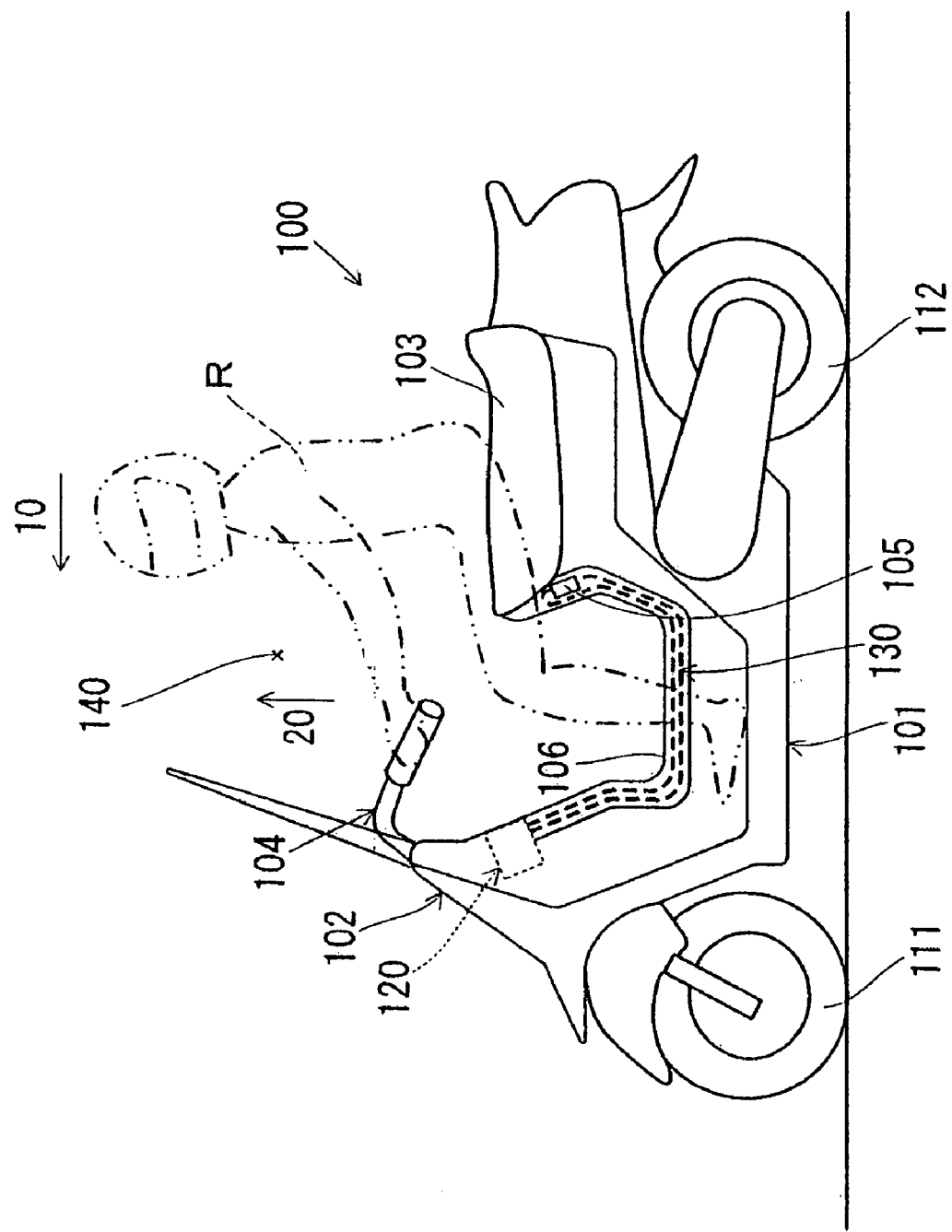
FIG. 1 is a side view of a scooter-type motorcycle 100 according to the present embodiment, showing a state in which an airbag apparatus 120 is mounted to the motorcycle 100.
Figure 2:
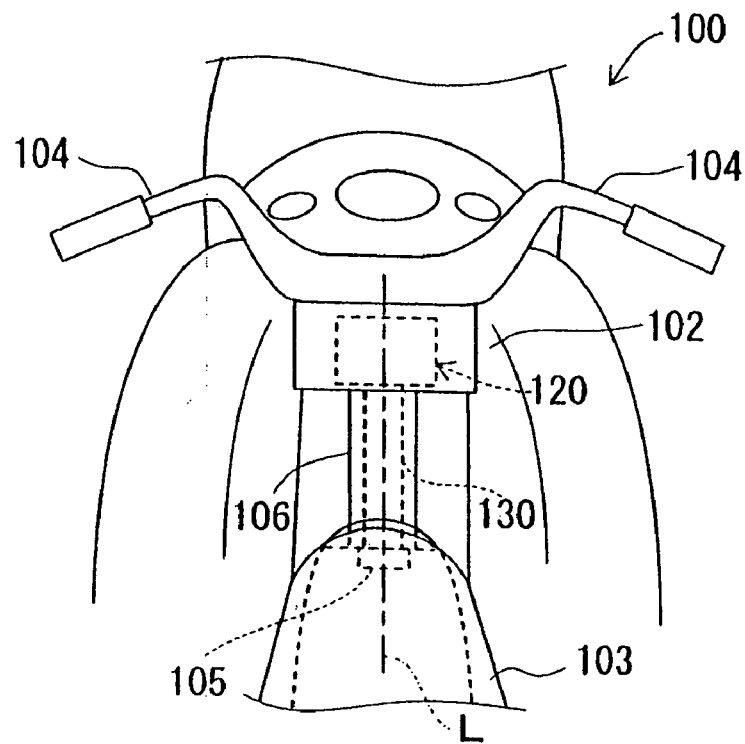
FIG. 2 is a side view of a front portion 102 in FIG. 1 when viewed from a rider R.
Figure 3:
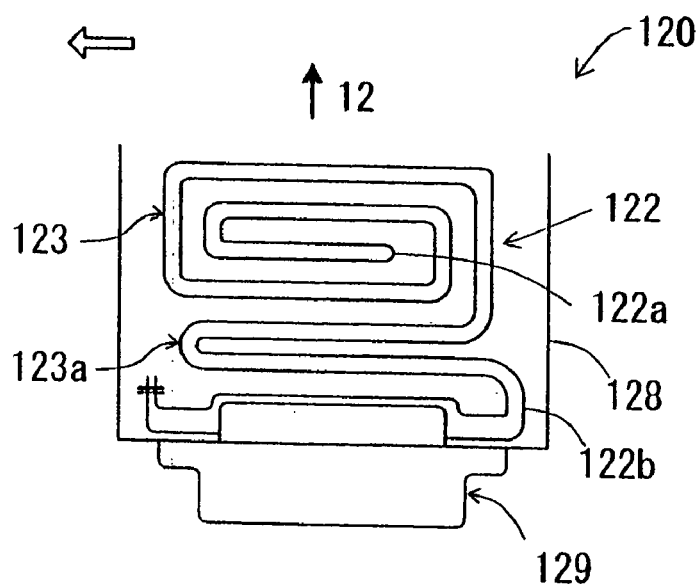
FIG. 3 is a drawing showing the configuration of the airbag apparatus 120 in FIG. 1.
Figure 4:
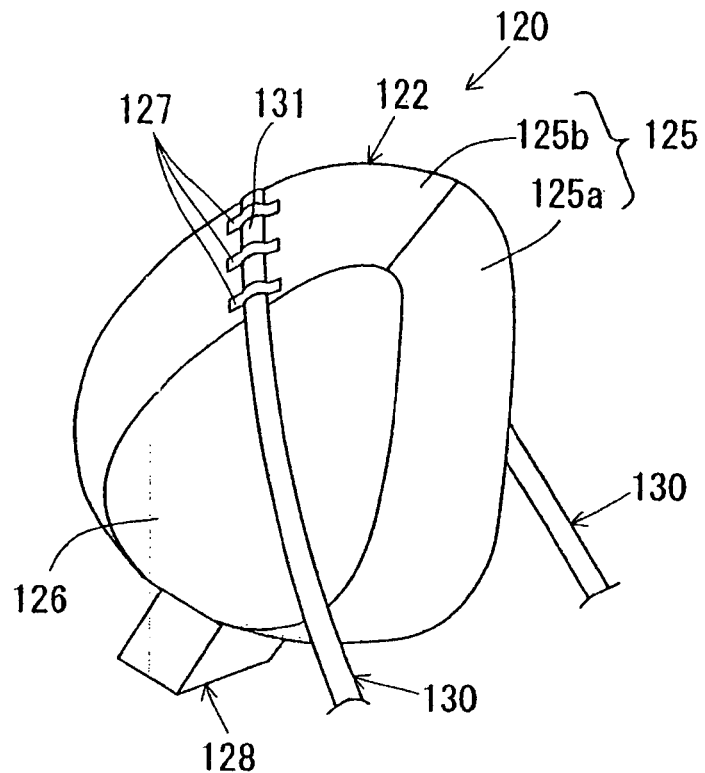
FIG. 4 is a perspective view of an airbag 122 in FIG. 3 when deployment and inflation are completed.
Figure 5:
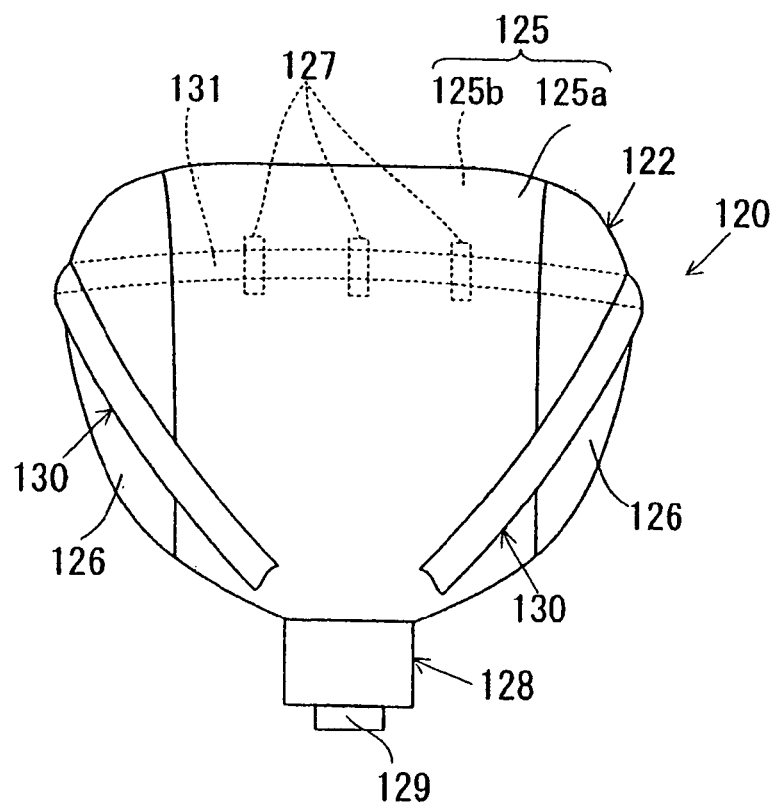
FIG. 5 is a drawing of the airbag in FIG. 4 when viewed from the rider R.

Referring now to the drawings, embodiments of the present invention will be described in detail. Referring first to FIG. 1 to FIG. 4, the configuration of a scooter-type motorcycle 100 according to the present embodiment will be described. FIG. 1 is a side view of the scooter-type motorcycle 100 according to the present embodiment, showing a state in which an airbag apparatus 120 is mounted to the motorcycle 100. FIG. 2 is a side view of a front portion 102 in FIG. 1 when viewed from a rider R. FIG. 3 is a drawing showing the configuration of the airbag apparatus 120 in FIG. 1. FIG. 4 is a perspective view of an airbag 122 in FIG. 3 when deployment and inflation are completed. FIG. 5 is a drawing of the airbag in FIG. 4 when viewed from the rider R. The motorcycle 100 of the present embodiment corresponds to an example of the "motorbike" in the present invention.

As shown in FIG. 1, the motorcycle 100 is configured as a scooter composed mainly of a vehicle body structure 101 including an engine, and a main frame, a seat 103 on which the rider R can sit astride, a steering handle 104, a front wheel 111, and a rear wheel 112.

An area upwardly of the vehicle body structure 101 of the motorcycle 100 and the front side of the rider R is defined as a rider protecting area 140 for the case where a front collision of the motorcycle 100 is encountered. In the present embodiment, the term "front collision" widely includes a state in which the motorcycle 100 is collided with an object of collision in front thereof (not shown specifically for the sake of convenience). The term "rider protecting area 140" in the present embodiment is defined as a space, which extends in the direction forwardly of the motorcycle 100 (the direction indicated by an arrow 10 in FIG. 1) for restraining and protecting the rider R from being thrown out forwardly of the motorcycle 100 when the rider R tends to be moved by a kinetic energy generated by the front collision.

The front portion 102 of the vehicle body structure 101 on the front side of the vehicle body is provided with the airbag apparatus 120 and various meters and switches. In particular, the airbag apparatus 120 is disposed so as to face the aforementioned rider protecting area 140. In other words, according to the present embodiment, the airbag apparatus 120 is arranged so that the direction of projection (deployment and inflation) of the airbag 122 described later is directed upwardly toward the front of the rider R. This airbag apparatus 120 corresponds to the "airbag apparatus" in the present invention. Extending between the airbag apparatus 120 and a fixing member 105 (mounting portion) provided downwardly of the seat 103 is a belt-type webbing 130 for anchoring the airbag 122 to the vehicle body side. The webbing 130 corresponds to the "elongated anchor member" in the present invention. The fixing member 105 is disposed on the back side of the airbag 122 with respect to the vehicle body, or on the back side of the rider protecting area 140, and the position of the fixing member 105 corresponds to the "back side with respect to the vehicle body" or "back side of the rider protecting area with respect to the vehicle body" in the present invention.

In the present embodiment, the single webbing 130 extending from the fixing member 105 located on the back side of the airbag 122 with respect to the vehicle body is arranged to extend along the airbag apparatus 120 side and head back to the original position of the fixing member 105 again. In other words, the webbing 130 extends between the airbag apparatus 120 and the fixing member 105 along two routes in parallel. The webbing 130 may be configured to be mounted to the fixing member 105 at both ends or may be configured into an annular shape in a state of being connected at both ends. The webbing 130 is configured to be covered by a webbing cover 106 provided on the vehicle body structure 101 side in a state in which the airbag apparatus 120 is not in operation. The webbing 130 may be formed, for example, of the same webbing material as that used for a seat belt for a motor vehicle (a belt-shaped member formed of resin fiber strings), or of the same cloth material as the airbag.

As shown in FIG. 2, the webbing 130 is disposed between the airbag apparatus 120 side and the fixing member 105 along the centerline L. The centerline L extends in the fore-and-aft direction of the vehicle body along the center of the vehicle body, and the centerline L passes between left and right legs of the rider R when the rider R sits on the seat 103 astride. Therefore, the webbing 130 is disposed so as to pass substantially the center of the rider R in plan view. This arrangement of the webbing 130 corresponds to the state in which "the anchor member is disposed in the center area of the vehicle body extending between the legs of the rider" in the present invention. According to the arrangement of the webbing 130 as described above, the webbing 130 can be prevented from being interfering with the rider R as much as possible not only in the case of being covered by the webbing cover 106, but also the case where covering by the webbing cover 106 is released.

As shown in FIG. 3, the airbag apparatus 120 mainly includes a retainer 128 as a storing member, the airbag 122 to be stored in the retainer 128 in a folded state, and an inflator 129 for supplying inflation gas for allowing the airbag 122 to be deployed from the retainer 128 and inflated. The airbag 122 corresponds to the "airbag" in the present invention. In FIG. 3, the direction of projection (deployment) of the airbag 122 is indicated by an arrow 12.

The airbag 122 is stored in the retainer 128 while forming, for example, an accordion-folded portion 123*a* which is folded in an accordion shape, and a roll-folded portion 123 folded into a roll by being rolled clockwise about the center of folding 122*a* in FIG. 3. An opening end 122*b* of the airbag 122 is mounted to a gas supply portion of the inflator 129.

The airbag 122 includes a main panel 125 and a pair of left and right side panels 126 to be assembled to both sides of the main panel 125 as shown in FIG. 4 and FIG. 5. The main panel 125 includes a rider-side panel-forming cloth 125*a* disposed at the position facing the rider R when deployment and inflation are completed and a front-side panel-forming cloth 125*b* disposed on the front side of the vehicle body when deployment and inflation are completed. The front-side panel-forming cloth 125*b* corresponds to the "front wall portion of the airbag with respect to the vehicle body" in the present invention. The airbag 122 is formed, for example, by stitching the side panels 126 to both ends of the main panel 125.

The airbag 122 includes a plurality of cloth strips 127 (three pieces in the present embodiment) joined by stitching on the outer surface of the front-side panel-forming cloth 125*b*. These cloth strips 127 are formed, for example, of the same material as the airbag 122. The number and the shape of the cloth strips 127 may be changed as needed.

In the present embodiment, a gap for allowing insertion of the webbing 130 is formed between each cloth strip 127 and the front-side panel-forming cloth 125*b*, and the webbing 130 is inserted into the cloth strips 127 through these gaps in sequence. Therefore, the webbing 130 is allowed to move in the extending direction of the webbing 130 with respect to the airbag 122 in a state of being guided by these cloth strips 127. In other words, in the present embodiment, the webbing 130 is simply passes along the front side of the airbag 122 with respect to the vehicle body, but is not fixed to the airbag 122. In this arrangement, since the movement of the webbing 130 (extending portion 131) with respect to the airbag 122 is allowed by the function of the cloth strips 127, the shape of the airbag 122 when the airbag 122 is deployed and inflated can be stabilized, for example, in comparison with the configuration in which the webbing 130 is fixed to the airbag 122.

In a state in which the webbing 130 is inserted through the cloth strips 127, the single webbing 130 extending from the fixing member 105 passes along the side portion of the side panel 126 of the airbag 122, then, along the outer surface of the front-side panel-forming cloth 125*b* with a extending portion 131, and then heads back to the fixing member 105 again. In other words, the webbing 130 is configured to be disposed outside the airbag 122. The extending portion 131 of the webbing 130 extends on the outer surface of the front-side panel-forming cloth 125*b* so as to be capable of coming into abutment therewith. Therefore, the extending portion 131 is configured to abut against the outer surface of the front-side panel-forming cloth 125*b* of the airbag 122 which is completely deployed and inflated, and hold the front side of the airbag 122 with respect to the vehicle body from the back side of the vehicle body. The extending portion 131 corresponds to the "extending portion" in the present invention.

In this arrangement, by the operation of the webbing 130 which holds the front side of the airbag 122 with respect to the vehicle body from the back side of the vehicle body for restraining the rider, the airbag 122 is hardly urged toward the front of the vehicle body, and the airbag 122 can generate a sufficient resistance for restraining the rider R. Also, by disposing the webbing 130 outside the airbag 122, the load exerted toward the outer periphery of the airbag 122 when deployed and inflated can be received by the entire webbing 130. Therefore, by selecting the shape, material, and the like of the webbing 130 as needed, the strength of the webbing 130 against the load exerted by the airbag 122 when deployed and inflated may be increased in comparison with the configuration in which the webbing 130 is disposed inside the airbag 122, the webbing 130 of the invention can cope with the larger load exerted when restraining the rider.

Figure 6:
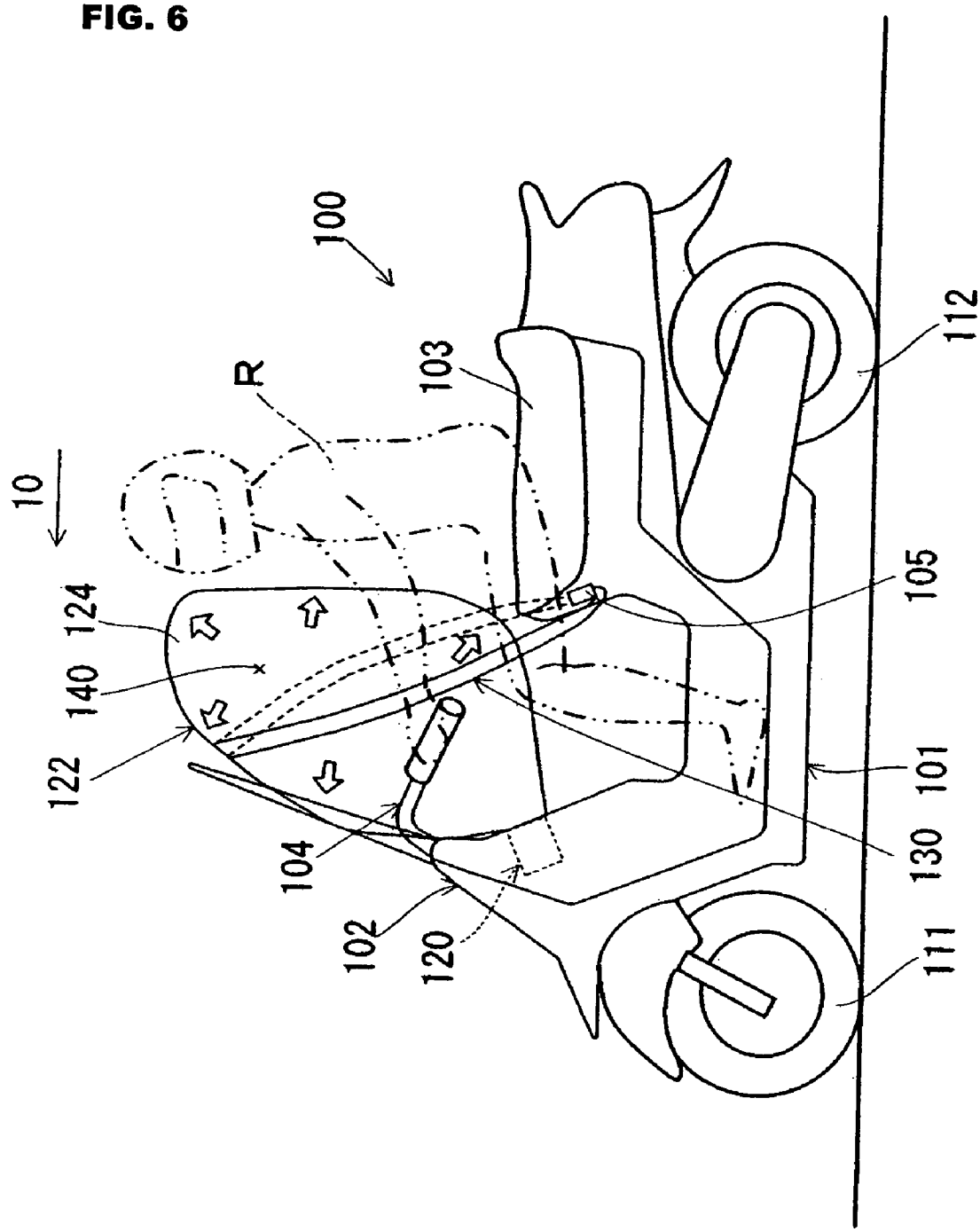
FIG. 6 is a side view of the motorcycle 100 showing a state in which deployment and inflation of the airbag 122 are completed.

Referring now to FIG. 6 in addition to FIG. 1 and FIG. 3, the motorcycle 100 according to the present embodiment arranged and manufactured as described above and the operation of the airbag 120 will be described. FIG. 6 is a side view of the motorcycle 100, and showing a state in which deployment and inflation of the airbag 122 are completed.

When the motorcycle 100 with the rider R riding thereon in the state shown in FIG. 1 collides with an object located in the direction of travel, the rider R tends to move (be thrown out) forwardly of the motorcycle 100, for example, in the direction indicated by the arrow 10 in FIG. 1. In the present embodiment, projection (deployment) of the airbag 122 from the airbag apparatus 120 toward the rider protecting area 140 is initiated upon detection of the front collision.

When projection (deployment) of the airbag 122 is initiated, the accordion-folded portion (accordion-folded portion 123a in FIG. 3) of the airbag 122 projects first, and the roll-folded portion (roll-folded portion 123 in FIG. 3) is deployed in the direction of projection while being unrolled toward the rider protecting area 140 as described above. When deployment of the airbag 122 is initiated and inflation gas is fed into the airbag 122 via the inflator 129 in the retainer 128, the inflated portion is formed in the airbag 122 in sequence from the retainer 128 side. The state of the airbag 122 being deployed and inflated corresponds to "deployment and inflation" in the present invention.

In the present embodiment, the webbing 130 is configured to allow (not to restrict) the movement of the airbag 122 in the direction of projection (in the direction indicated by an arrow 20 in FIG. 1) in the process of deployment and inflation of the airbag 122. This direction corresponds to the "projecting direction" in the present invention. In other words, the sufficient length and the layout of the webbing 130 of the present embodiment are selected so as not to restrict the operation of the airbag 122 in the process of deployment and inflation as much as possible. For example, the webbing 130 is selected to have a length sufficiently longer than the air-line distance between the airbag apparatus 120 and the fixing member 105. In this arrangement, the smooth operation of the airbag 122 in the process of deployment and inflation is achieved.

In addition, in the present embodiment, since the webbing 130 is disposed at the position passing between the left and the right legs of the rider R, even when covering of the webbing 130 by the webbing cover 106 is released when the airbag 122 is deployed and inflated, the webbing 130 is prevented from being caught on the rider R or the members on the vehicle body structure 101 side, so that the smooth operation of deployment and inflation of the airbag 122 is achieved.

In addition, as deployment and inflation of the airbag 122 progresses, the roll-folded portion (the roll-folded portion 123 in FIG. 3) of the airbag 122 is decreasing while an inflated portion 124 is enlarged in sequence. At this time, when deployed, the airbag 122 projects at the accordion-folded portion (the according-folded portion 123a in FIG. 3) first, and then the roll of the roll-folded portion 123 is released to the direction away from the rider R at the position sufficiently apart from the vehicle body structure 101. Therefore, the structure in which the airbag 122 is smoothly deployed toward the rider protecting area 140 without interrupting deployment is ensured.

In this manner, deployment and inflation of the airbag 122 are completed, and the inflated portion 124 as shown in FIG. 6 is formed in the rider protecting area 140. In this state in which the airbag 122 is completely deployed and inflated, the inflated portion 124 of the airbag 122 fills up the rider protecting area 140, and the rider R who tends to be moved in the direction indicated by the arrow 10 by a kinetic energy generated by the collision is retained and restrained reliably in the rider protecting area 140 so as to prevent the rider R from being thrown up forwardly of the motorcycle 100.

In the present embodiment, since the cloth strips 127 for allowing movement of the webbing 130 (extending portion 131) are provided on the outer surface of the front-side panel-forming cloth 125b, the shape of the airbag 122 when deployed and inflated may be stabilized.

In addition, as shown in FIG. 6, in a state in which the airbag 122 is deployed and inflated, the webbing 130 in a state in which covering by the webbing cover 106 is released is linearly expanded between the airbag 122 and the fixing member 105. In this state, the movement of the airbag 122 toward the front with respect to the vehicle body is restricted by the action of the tensile strength of the webbing 130.

In particular, in the present embodiment, the webbing 130 holds the front side of the airbag 122 with respect to the vehicle body via the extending portion 131 from the back side with respect to the vehicle body. Therefore, the airbag 122 is hardly urged forwardly of the vehicle body when restraining the rider, and the airbag 122 can generate a sufficient resistance for restraining the rider R. Also in a state in which the webbing 130 disposed outside the airbag 122 holds the front side of the airbag 122 with respect to the vehicle body from the back side with respect to the vehicle body via the extending portion 131, the load exerted toward the outer periphery of the airbag 122 is received by the entire webbing 130. Therefore, the strength against the load exerted by the airbag 122 may be increased, and the webbing 130 can cope with the larger load exerted when restraining the rider.

In the present embodiment, since the webbing 130 is disposed so as to pass substantially the center of the rider R in plan view, interference between the webbing 130 and the rider R can be restricted when the airbag 122 is deployed and inflated.

The present invention is not limited to the above-described embodiments, and various applications or modifications may be contemplated. For example, the following forms, which are modifications of the above-described embodiments, are also applicable.

While the webbing 130 passes only along the front side of the airbag with respect to the vehicle body and is not fixed to the airbag 122 in the above-described embodiment, a configuration in which the webbing 130 is fixed to the airbag 122 by stitching and joining the webbing 130 directly to the front-side panel-forming cloth 125b may also be applicable.

While the movement of the airbag 122 in the direction of projection thereof in the process of deployment and inflation is allowed by determining the length of the webbing 130 in an adequate length in the above-described embodiment, this configuration may be realized by other mechanism.

For example, a configuration in which retracting mechanism which can retract the webbing is provided and, in the process of deployment and inflation of the airbag, the retracting mechanism releases the webbing while reducing a force exerted to the webbing, and when deployment and inflation of the airbag are completed, the webbing is withdrawn from the retracting mechanism to the maximum extent to restrict the movement of the airbag toward the front of the vehicle body, is also applicable.

While the configuration in which the webbing 130 is arranged in the space extending between the left and the right legs of the rider who is sitting on the seat 103 astride has been described in the above-described embodiments, the arrangement of the webbing may be variously changed as needed as long as the movement of the airbag in its projecting direction is allowed in the process of deployment and inflation.

The number of webbings (anchor members), the number of the webbings (anchor members) extending along the front side of the airbag 122 with respect to the vehicle body, and the number of extensions of the webbings (anchor members)

extending between the airbag apparatus 120 and the fixing member 105 are not limited, and may be variously changed as needed.

While the scooter-type motorcycle 100 has been described in the above-described embodiments, the present invention may also be applied to other types of motorbike.

According to the present invention, an airbag configuration technology which contributes to intensive protection of the rider of motorbike in case of accident, and other technologies related thereto are provided.

What is claimed is:

1. An airbag apparatus for a vehicle having a body extending in forward and rearward directions, the airbag apparatus comprising:
    an airbag having front and rear portions with the front portion facing in the forward direction and the rear portion facing in the rearward direction upon airbag inflation;
    an anchor member secured to the vehicle rearwardly of the deployed airbag front portion; and
    an extending portion of the anchor member extending along the airbag front portion in non-fixed relation thereto, the extending portion restraining movement of the airbag front portion in the forward direction by engagement with the airbag front portion with the airbag inflated.

2. The airbag apparatus of claim 1 wherein the anchor member comprises elongate belt webbing.

3. An airbag apparatus for a vehicle having a body extending in forward and rearward directions, the airbag apparatus comprising:
    an airbag having front and rear portions with the front portion facing in the forward direction and the rear portion facing in the rearward direction upon airbag inflation; and
    an anchor member secured to the vehicle rearwardly of the deployed airbag front portion and restraining movement of the airbag front portion in the forward direction by engagement with the airbag front portion with the airbag inflated,
    wherein the anchor member comprises at least one flexible member having an extending portion that extends along the airbag front portion and moves therewith as the airbag is deployed.

4. The airbag apparatus of claim 1 wherein the airbag includes an outer surface and the anchor member extending portion engages the outer surface of the airbag front portion.

5. The airbag apparatus of claim 1 wherein the anchor member has a predetermined length in the forward and rearward directions selected to allow the airbag front portion to move in the forward direction as the airbag is being inflated and to restrict movement of the airbag front portion in the forward direction with the airbag inflated.

6. An airbag apparatus for a vehicle having a body extending in forward and rearward directions, the airbag apparatus comprising:
    an airbag having front and rear portions with the front portion facing in the forward direction and the rear portion facing in the rearward direction upon airbag inflation; and
    an anchor member secured to the vehicle rearwardly of the deployed airbag front portion and restraining movement of the airbag front portion in the forward direction by engagement with the airbag front portion with the airbag inflated,
    wherein the anchor member has a predetermined length in the forward and rearward directions selected to allow the airbag front portion to move in the forward direction as the airbag is being inflated and to restrict movement of the airbag front portion in the forward direction with the airbag inflated, the anchor member comprises an elongate member including parallel fore and aft extending sections each of the predetermined length, and a transverse section interconnecting the fore and aft sections and extending along the airbag front portion in engagement therewith with the airbag inflated.

7. An airbag apparatus for a vehicle having a body extending in forward and rearward directions, the airbag apparatus comprising:
    an airbag having front and rear portions with the front portion facing in the forward direction and the rear portion facing in the rearward direction upon airbag inflation; and
    an anchor member secured to the vehicle rearwardly of the deployed airbag front portion and restraining movement of the airbag front portion in the forward direction by engagement with the airbag front portion with the airbag inflated,
    wherein the airbag front portion includes at least one guide member with the anchor member passing between the airbag front potion and the guide member to allow the anchor member and guide member to shift relative to each other during airbag inflation.

8. The airbag apparatus of claim 7 wherein the airbag includes an outer surface to which the guide member is secured with the anchor member passing between the outer surface on the airbag front portion and the guide member.

9. A motorbike having an airbag apparatus, the motorbike comprising:
    a frame extending in a fore and aft direction;
    a seat mounted to the frame on which a rider sits;
    a steering handle mounted to the frame forwardly of the seat;
    an airbag for being deployed and inflated in a rider protection area generally forwardly of the seat;
    a single anchor member for restraining movement of the airbag forwardly; and
    a transverse portion of the single anchor member extending transversely to the fore and aft direction that engages the airbag to restrain forward movement of the airbag with the airbag inflated.

10. The motorbike of claim 9 wherein the anchor member has a predetermined length in the fore and aft direction selected to allow forward movement of the airbag during inflation and to restrain forward movement of the airbag with the airbag inflated.

11. The motorbike of claim 9 wherein the anchor member extends in the fore and aft direction generally centrally along the frame to minimize interference with the rider during deployment of the airbag.

12. The motorbike of claim 9 including a retainer for the airbag mounted forwardly of the seat and a fixing member for securing the anchor member adjacent the seat with the anchor member comprising an elongate flexible member extending centrally along the frame in the fore and aft direction between the retainer and the fixing member.

13. The motorbike of claim 9 which the airbag includes an outer surface and the anchor member portion engages the outer surface of the airbag.

14. A motorbike having an airbag apparatus, the motorbike comprising:
    a frame extending in a fore and aft direction;
    a seat mounted to the frame on which a rider sits;

a steering handle mounted to the frame forwardly of the seat;

an airbag for being deployed and inflated in a rider protection area generally forwardly of the seat; and an anchor member for restraining movement of the airbag forwardly and including a portion extending transversely to the fore and aft direction that engages the airbag to restrain forward movement of the airbag with the airbag inflated, wherein the airbag includes a forwardly facing portion upon airbag inflation and the anchor member extends transversely across and in engagement with the airbag forwardly facing portion.

15. A motorbike having an airbag apparatus, the motorbike comprising:

a frame extending in a fore and aft direction;

a seat mounted to the frame on which a rider sits;

a steering handle mounted to the frame forwardly of the seat;

an airbag for being deployed and inflated in a rider protection area generally forwardly of the seat; and an anchor member for restraining movement of the airbag forwardly and including a portion extending transversely to the fore and aft direction that engages the airbag to restrain forward movement of the airbag with the airbag inflated, wherein the airbag includes guide members secured thereto and the anchor member portion passes between the airbag and the guide members to allow the anchor member portion and the guide member to shift relative to each other.

16. The motorbike of claim 15 wherein the airbag includes an outer surface to which the guide members are secured with the anchor member passing between the airbag outer surface and the guide member.

* * * * *